United States Patent
Thompson et al.

(10) Patent No.: US 8,353,202 B2
(45) Date of Patent: Jan. 15, 2013

(54) EXHAUST DIAGNOSTIC SYSTEMS AND METHODS WITH SCR CONVERSION EFFICIENCY MONITOR DISABLING

(75) Inventors: Brett B. Thompson, Farmington Hills, MI (US); Stephen Paul Levijoki, Swartz Creek, MI (US)

(73) Assignee: GM Global Technology Operations LLC

( * ) Notice: Subject to any disclaimer, the term of this patent is extended or adjusted under 35 U.S.C. 154(b) by 352 days.

(21) Appl. No.: 12/855,196

(22) Filed: Aug. 12, 2010

(65) Prior Publication Data

US 2012/0041596 A1 Feb. 16, 2012

(51) Int. Cl.
*G01M 15/10* (2006.01)
(52) U.S. Cl. .................................................. 73/114.75
(58) Field of Classification Search ............... 73/114.69, 73/114.71, 114.75
See application file for complete search history.

(56) References Cited

U.S. PATENT DOCUMENTS

| | | | | |
|---|---|---|---|---|
| 8,161,808 B2 * | 4/2012 | Crawford et al. | .......... | 73/114.75 |
| 8,201,443 B2 * | 6/2012 | Wang et al. | ................. | 73/114.75 |
| 8,250,913 B2 * | 8/2012 | Lee et al. | .................... | 73/114.75 |
| 2011/0023456 A1 * | 2/2011 | Levijoki et al. | .................. | 60/274 |
| 2011/0061363 A1 * | 3/2011 | Levijoki et al. | .................. | 60/273 |
| 2011/0061372 A1 * | 3/2011 | Levijoki et al. | .................. | 60/286 |

* cited by examiner

*Primary Examiner* — Eric S McCall

(57) ABSTRACT

A diagnostic control module includes a temperature gradient module. The temperature gradient module determines a temperature gradient across a selective catalytic reduction (SCR) catalyst of an exhaust system of an engine based on a plurality of temperature signals. A calibration module determines a weighted average based on the plurality of temperature signals. A SCR efficiency control module disables conversion efficiency monitoring based on the temperature gradient and the weighted average.

19 Claims, 3 Drawing Sheets

EXHAUST DIAGNOSTIC SYSTEMS AND METHODS WITH SCR CONVERSION EFFICIENCY MONITOR DISABLING

FIELD

The present disclosure relates to vehicle exhaust systems, and more particularly to exhaust diagnostic systems and methods that test selective catalyst reduction (SCR) conversion efficiency.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During a combustion cycle of an engine, an air/fuel mixture is delivered through an intake valve opening into a cylinder. The air/fuel mixture is compressed and combusted to provide output torque. After combustion, a piston forces exhaust gas in the cylinder out through an exhaust valve opening and into an exhaust system. The exhaust gas may contain oxides of nitrogen ($NO_x$) and carbon monoxide (CO).

An exhaust gas treatment system of the engine may include a selective catalytic reduction (SCR) catalyst to reduce nitrogen oxides ($NO_x$). A SCR catalyst converts the $NO_x$ into nitrogen $N_2$ and water $H_2O$. Reductant may be added to exhaust gas upstream from the SCR catalyst. For example only, the reductant may include anhydrous ammonia, aqueous ammonia or urea.

An exhaust diagnostic system may include a SCR catalyst monitor that monitors conversion efficiency of the SCR catalyst. The conversion efficiency refers to a rate at which the SCR catalyst reduces $NO_x$ in a certain period of time. The efficiency of a SCR catalyst may decrease over time and based on SCR catalyst usage. The SCR catalyst monitor may indicate when the conversion efficiency is less than a predetermined threshold. In some vehicles, an engine control module may limit vehicle speed and/or engine speed when conversion efficiency is less than a predetermined threshold.

SUMMARY

A diagnostic control module is provided and includes a temperature gradient module. The temperature gradient module determines a temperature gradient across a selective catalytic reduction (SCR) catalyst of an exhaust system of an engine based on a plurality of temperature signals. A calibration module determines a weighted average based on the plurality of temperature signals. A SCR efficiency control module disables conversion efficiency monitoring based on the temperature gradient and the weighted average.

In other features, a diagnostic control module is provided and includes a temperature gradient module. The temperature gradient module determines a temperature difference between a first temperature signal and a second temperature signal. A calibration module determines a threshold value. A SCR efficiency control module generates a disable signal to stop determining conversion efficiency based on the temperature difference and the threshold value. The first temperature signal indicates a first temperature of an exhaust system upstream from a SCR catalyst. The second temperature signal indicates a second temperature of the exhaust system downstream of the SCR catalyst.

In other features, a method of operating a diagnostic control module includes generating a first temperature signal that indicates a first temperature upstream of a SCR catalyst. A second temperature signal is generated that indicates a second temperature downstream of the SCR catalyst. A temperature gradient is determined based on the first temperature and the second temperature. A weighted average is determined based on a first weight multiplied by the first temperature and a second weight multiplied the second temperature. A disable signal is generated based on a first comparison between the temperature gradient and a first calibration value and a second comparison between the weighted average and a second calibration value. Conversion efficiency monitoring is disabled based on the disable signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
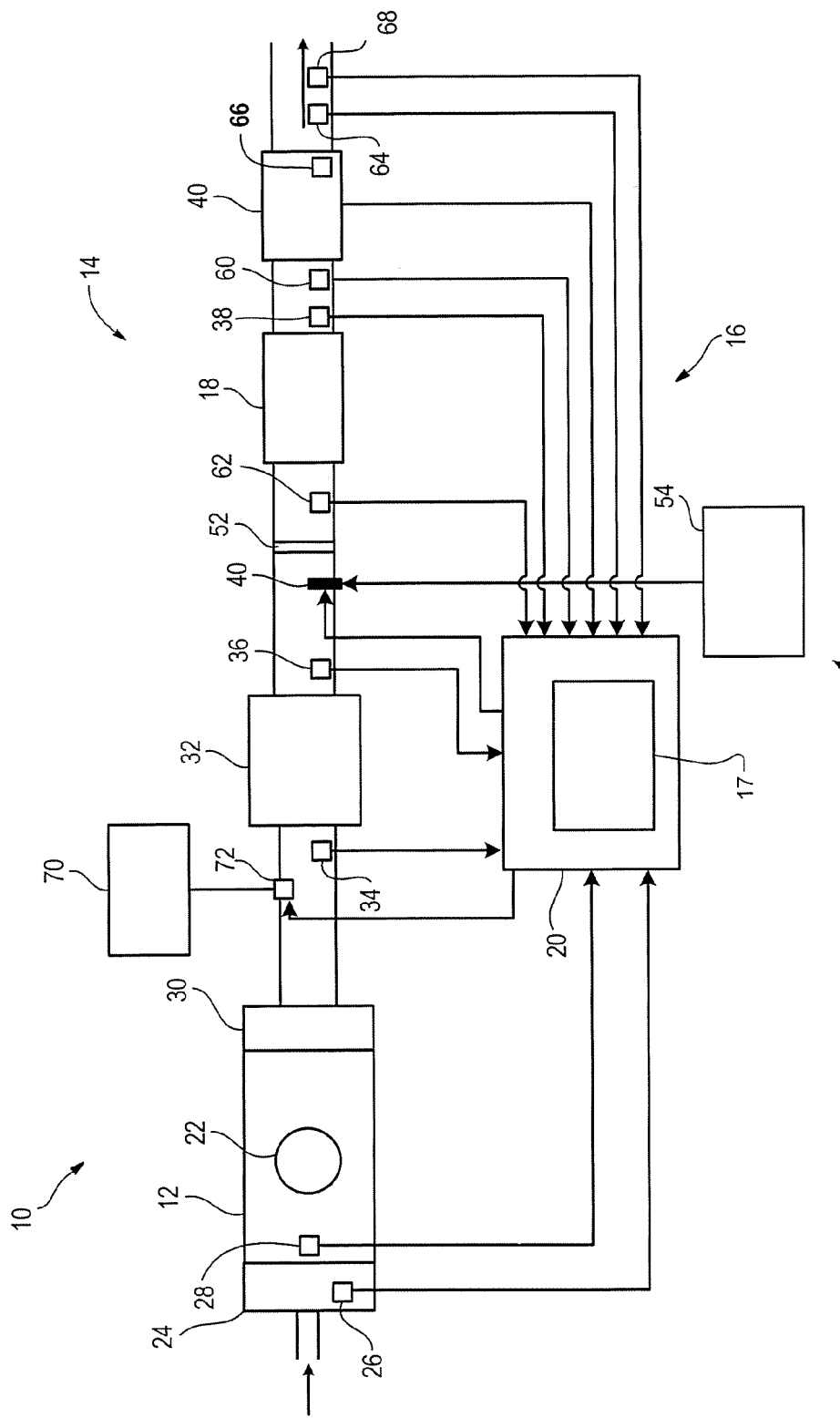
FIG. 1 is a functional block diagram of an engine control system including a diagnostic control system in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A diagnostic control system may monitor conversion efficiency of a selective catalytic reduction (SCR) catalyst. SCR catalyst conversion efficiency monitoring (conversion efficiency monitoring) may be disabled under certain conditions, such as during a startup of an engine. A SCR catalyst may be active at, for example, temperatures greater than or equal to approximately 200-350° C. An example light-off temperature may be 250° C. During a cold start of an engine, temperature gradients may exist in the SCR catalyst, for example between an inlet and an outlet of the SCR catalyst. Temperature of the inlet increases to a light-off temperature before temperature of the outlet and thus temperature of the inlet can be greater than temperature of the outlet. The temperature gradients may be greater than a predetermined threshold. Due to the temperature gradients, SCR catalyst efficiency model may not be accurate.

The disabling of SCR catalyst conversion efficiency monitoring may be performed based on (i) a rate of change in temperature of the SCR catalyst or (ii) a weighted average of temperatures of the SCR catalyst. The rate of change in temperature and the weighted average of temperatures may be determined based on information from one or more temperature sensor(s) of the SCR catalyst and/or based on modeled temperature(s) of the SCR catalyst. However, this described disabling does not account for the temperature gradients across the SCR catalyst. Since the temperature gradients are not accounted for, SCR catalyst efficiency measurements can have variance over different temperature distribution conditions in the SCR catalyst.

This variance in measured conversion efficiency has an adverse affect on conversion efficiency separation. Conversion efficiency separation refers to a difference in efficiency between a worst performing acceptable (WPA) SCR system (least acceptable conversion efficiency) and a best performing unacceptable (BPU) SCR system (maximum unacceptable conversion efficiency). The difference may be between: a WPA efficiency distribution and a BPU efficiency distribution; a 2σ (2 sigma) point of the BPU distribution and a 4σ point of the WPA distribution; mean values of the WPA and BPU efficiency distributions; etc. The smaller the conversion efficiency separation the less likely that a WPA SCR catalyst passes and/or a BPU SCR catalyst fails an efficiency test. The decreased conversion efficiency separation leads unnecessary warranty costs and/or non-compliance with government regulations. Also, the inaccuracy in efficiency model prevents providing accurate predictions of expected efficiency for a WPA system, which can reduce the conversion efficiency separation.

The below described disclosure provides implementations for disabling SCR catalyst conversion efficiency monitoring while accounting for temperature gradients in a SCR catalyst. The implementations include increasing conversion efficiency separation. This improves efficiency test pass rates and increases acceptable operating life of a SCR catalyst, reduces SCR catalyst replacements, and reduces associated warranty costs.

In FIG. 1, an engine control system 10 is shown. The engine control system 10 includes an internal combustion engine (ICE) 12, an exhaust system 14 and a diagnostic control system 16. The exhaust system 14 includes a SCR catalyst 18 that reduces nitrogen oxides ($NO_x$) in the exhaust system 14. The diagnostic control system 16 includes a diagnostic control module 17 that monitors efficiency of the SCR catalyst 18 and performs countermeasure(s) when the efficiency fails an efficiency test. The diagnostic control module 17 also disables SCR catalyst conversion efficiency monitoring during certain conditions to increase SCR separation. The conditions are described below.

The engine control system includes the ICE 12 and an engine control module (ECM) 20. The ICE 12 includes a cylinder 22, an intake manifold 24, a mass air flow (MAF) sensor 26 and an engine speed sensor 28. Air flows into the ICE 12 through the intake manifold 24 and is monitored by the MAF sensor 26. The air is directed into the cylinder 22 and is combusted with fuel to drive pistons (not shown). Although a single cylinder is illustrated, the ICE 12 may include any number of cylinders. The ECM 20 regulates and controls the operation of the engine system 10 based on information from the diagnostic control module 17 and/or information from various sensors, some of which are described below.

Exhaust gas is produced inside the cylinder 22 as a result of the combustion process. The exhaust system 14 treats the exhaust gas before the exhaust gas is released to atmosphere. The exhaust system 14 includes an exhaust manifold 30 and a diesel oxidation catalyst (DOC) 32. The exhaust manifold 30 directs exhaust exiting the cylinder 22 through the DOC 32. The exhaust is treated within the DOC 32 to reduce emissions.

The exhaust system 14 further includes the SCR catalyst 18, a first temperature sensor 34, an inlet (second) temperature sensor 36, an outlet (third) temperature sensor 38 and a particulate filter (PF) 40. The first temperature sensor 34 may be located between the ICE 12 and the DOC 32. The inlet temperature sensor 36 may be located upstream from the SCR catalyst 18, between the SCR catalyst 18 and the ICE 12, and/or between the SCR catalyst 18 and the DOC 32. The inlet temperature sensor 36 generates an inlet temperature signal TI that indicates temperature of an inlet of the SCR catalyst 18.

The outlet temperature sensor 38 is located downstream from the SCR catalyst 18 and detects outlet temperature of the SCR catalyst 18. The outlet temperature sensor generates an outlet temperature signal TO. Although the exhaust system 14 includes the inlet and outlet temperature sensors 36, 38 arranged upstream and downstream from the SCR catalyst 18, the inlet and outlet temperature sensors 36, 38 may be located on the SCR catalyst 18. The inlet and outlet temperature sensors 36, 38 monitor temperatures of exhaust entering and exiting the SCR catalyst 18 and/or temperatures at the inlet and outlet of the SCR catalyst 18. The PF 40 further reduces emissions by trapping particulates (i.e., soot) in the exhaust gas.

The exhaust system 14 may further include a dosing system 50. The dosing system 50 includes a dosing injector 52 that injects reductant from a reductant fluid supply 54 into the exhaust gas. The reductant mixes with the exhaust gas and further reduces emissions when exposed to the SCR catalyst 18. A mixer 56 may be used to mix the reductant with the exhaust gas upstream from the SCR catalyst 18.

The exhaust system 14 may yet further include an exhaust gas flow rate sensor 60 that generates a flow rate signal FLOW corresponding to the flow of exhaust in the exhaust system 14. Although only one flow rate sensor is illustrated between the SCR catalyst 18 and the PF 40, additional flow rate sensors may be incorporated upstream and/or downstream from the SCR catalyst 18. Flow rate may indirectly determined without the use of flow rate sensors. The diagnostic control module 17 and/or the ECM 20 may determine flow rate based on a MAF signal from the MAF sensor 26, state of an EGR valve, and other combustion relevant information.

Flow rates of $NO_x$ upstream and downstream from the SCR catalyst 18 may be determined based on $NO_x$ signals from first and second $NO_x$ sensors 62, 64. The $NO_x$ sensors 62, 64 may be located upstream and downstream from the SCR catalyst 18. The first $NO_x$ sensor 62 may measure $NO_x$ entering the SCR catalyst 18 and generate a first $NO_x$ signal NOX1. The second $NO_x$ sensor 64 may measure $NO_x$ leaving the SCR catalyst 18 and/or the PF 40 and generate a second $NO_x$ signal NOX2. Although the second $NO_x$ sensor 64 is located downstream from the PF 40, the second $NO_x$ sensor 64 may be located between the SCR catalyst 18 and the PF 40.

Other sensors in the exhaust system 14 may include a PF temperature sensor 66 and an ammonia ($NH_3$) sensor 68. The PF temperature sensor 66 may be located on the PF 40. The PF temperature sensor 66 generates a PF temperature signal. The PF temperature sensor 66 may alternatively be located upstream or downstream from the PF 40.

The $NH_3$ sensor 68 generates an ammonia signal indicating an amount of ammonia within the exhaust gas. The $NH_3$ sensor 68 may be used to discern between amounts of $NO_x$ and $NH_3$ in the exhaust gas. Alternately and/or in addition, a hydrocarbon (HC) supply 70 and a HC injector 72 may be provided to supply HC in the exhaust gas reaching the DOC 32.

Figure 2:
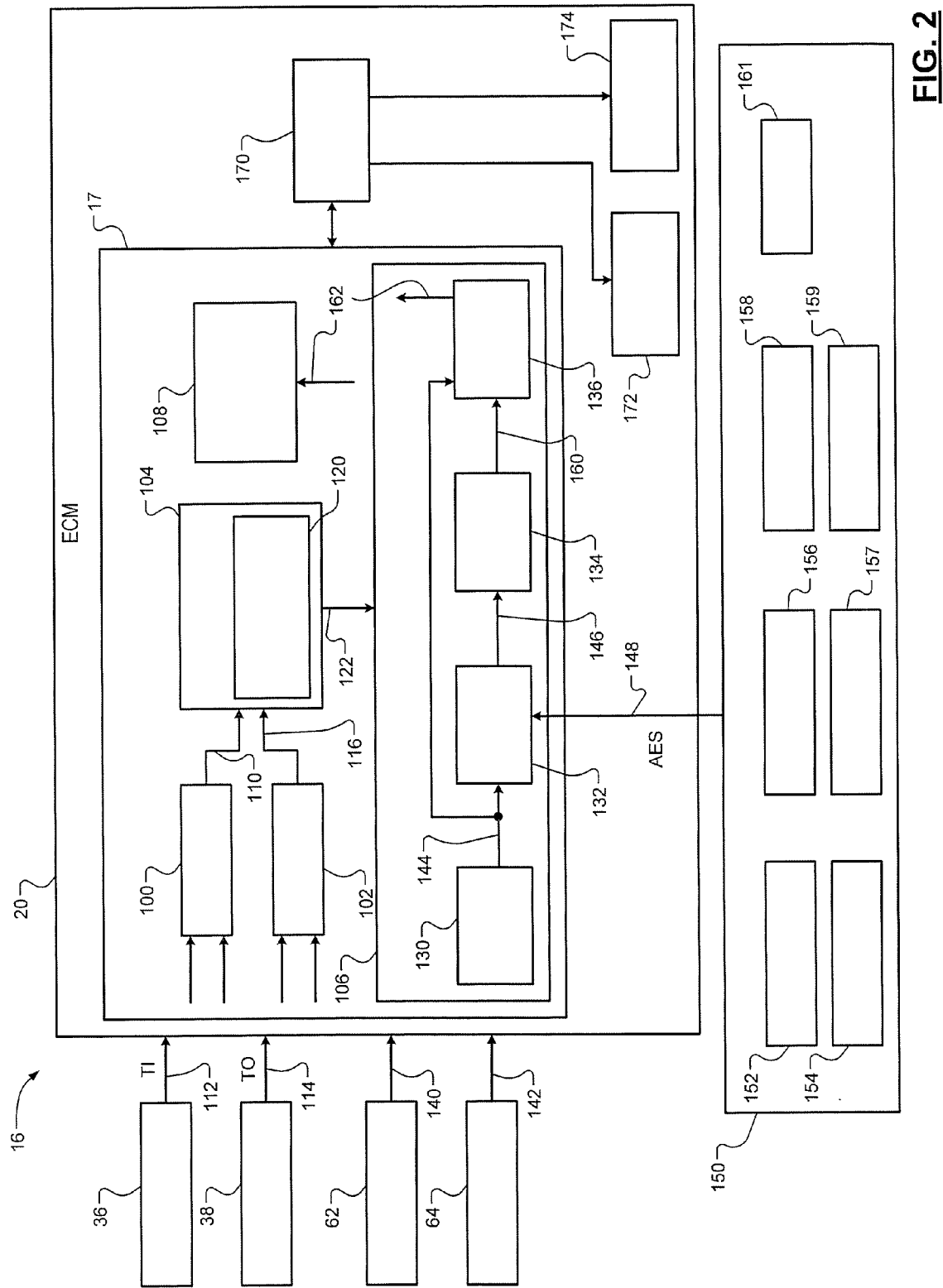
FIG. 2 is a functional block diagram of a portion of the diagnostic control system in accordance with the present disclosure.
Figure 3:
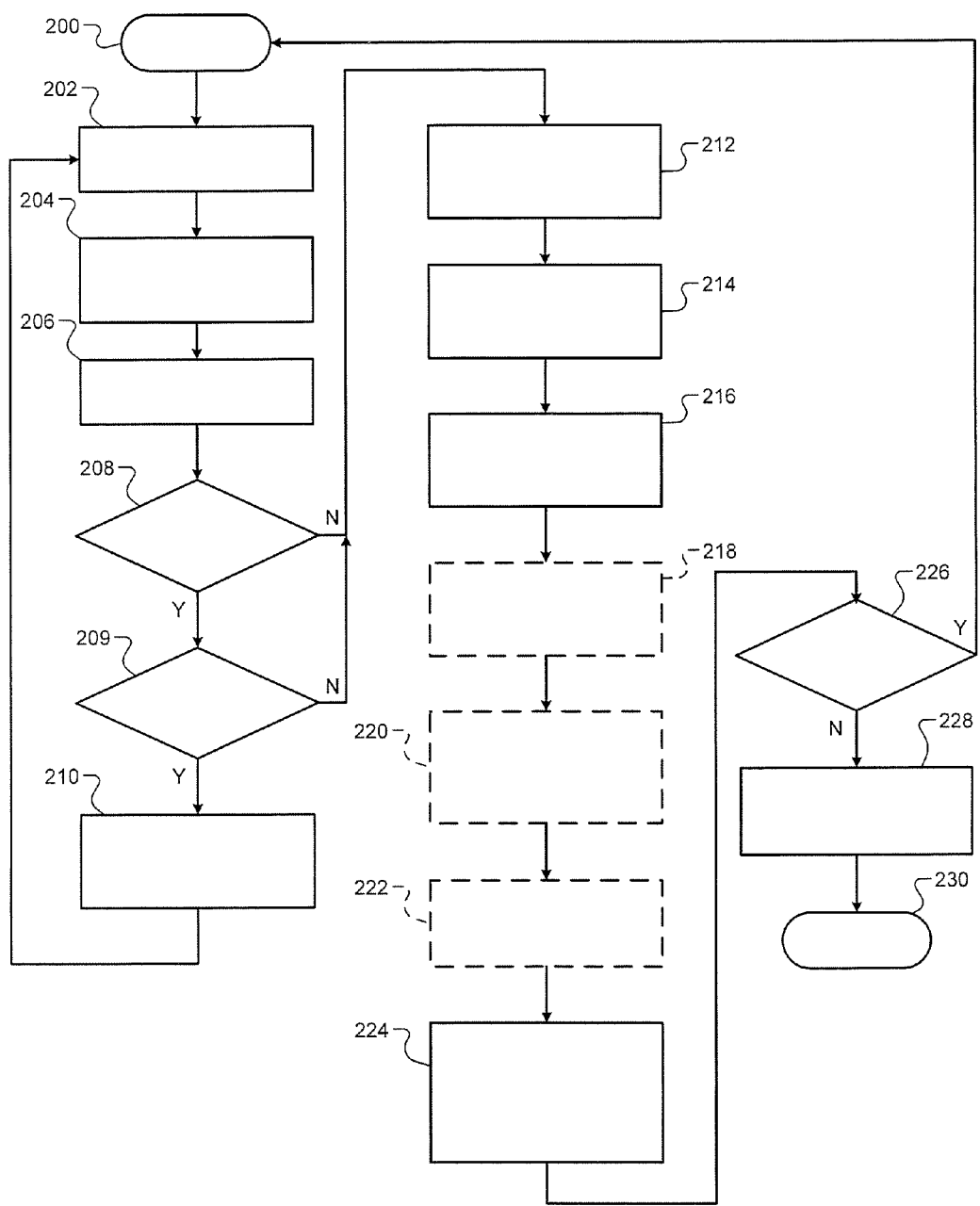
FIG. 3 illustrates a method of operating a diagnostic control system in accordance with the present disclosure.

Referring now also to FIGS. 2 and 3, a portion of the diagnostic control system 16 and a method of operating the diagnostic control system 16 are shown. The diagnostic control system 16 includes the ECM 20 with the diagnostic control module 17. The diagnostic control module 17 includes a temperature gradient module 100, a weighted average module 102, a SCR efficiency control module 104, a SCR efficiency monitoring module 106 and a countermeasure module 108.

Although the method is described with respect to the embodiments of FIGS. 1-2, the method may be applied to other embodiments of the present disclosure. The method may begin at 200. Below-described tasks 202-228 may be iteratively performed and may be performed by, for example, the modules and devices of FIGS. 1 and 2.

At 202, the temperature sensors 36, 38 generate the temperature signals TI, TO (112, 114). At 204, the temperature gradient module 100 receives the temperature signals TI, TO from the inlet and outlet temperature sensors 36, 38 and generates a temperature gradient signal GRAD 110. The temperature gradient module 100 determines a temperature gradient across the SCR catalyst 18 based on the temperature signals TI, TO. For example, the temperature gradient module 100 may determine a difference between the first temperature signal TI and the second temperature signal TO, as provided by equation 1.

$$GRAD = TI - TO \tag{1}$$

At 206, the weighted average module 102 receives temperature signals from the temperature sensors 36, 38 and generates a weighted average signal 116 indicating a weighted average value WA. The weighted average value WA may be generated as a function of the temperature signals TI, TO. As an alternative, the weighted average value WA may be a weighted average of the temperature signals TI, TO. An example of the weighted average value WA is provided by equation 2, where x is a calibrated value between 0 and 1. The calibrated value x may be calibrated based on, for example, thermocouple data of tested and/or modeled catalysts.

$$WA = [(x)TI + (1-x)TO] \tag{2}$$

The weighted average value WA indicates an average temperature of the SCR catalyst 18. The active volume of the SCR catalyst 18 may be determined based on the temperature signals TI, TO, the weighted average value WA, and/or other parameters. For example, the active volume may further be determined based on mass, resistance and/or impedance of the SCR catalyst 18. The active volume may also be determined based on, for example, ambient temperature, engine speed, camshaft phasing, ignition timing, duty cycle of the engine, etc.

The SCR efficiency control module 104 may include the gradient and average comparison (GAC) module 120. The GAC module 120 compares the temperature gradient to a first calibration threshold CAL1 and/or first threshold range R1 at 208. The SCR efficiency control module 104 generates a SCR enable/disable signal SCRACT (first comparison signal) 122 based on this comparison. Task 209 is performed when the temperature gradient is greater than the first calibration value CAL1 or outside of (i.e. greater than or less than) the first threshold range R1. The first threshold range R1 has maximum and minimum values. Task 212 may be performed when the temperature gradient is less than the first calibration value CAL1 or inside of the first threshold range R1. A first example comparison is shown by expression 3. A second example comparison is shown by expression 4. Expression 4 is shown to illustrate that the greater than and less than comparisons described herein may be arbitrary and may be selected based on the directions (positive/negative signs) and/or magnitudes of the values being compared.

$$TI - TO > CAL1 \tag{3}$$

$$TO - TI < CAL1 \tag{4}$$

The GAC module 120 compares the weighted average value WA to a second calibration threshold CAL2 and/or second threshold range R2 at 209. The second threshold range R2 has maximum and minimum values. The SCR efficiency control module 104 generates the SCR enable/disable signal SCRACT (first comparison signal) 122 based on this comparison. Task 210 is performed when the weighted average is greater than the second calibration value CAL2 or outside of the second threshold range R2. Task 212 is performed when the weighted average is less than the second calibration value CAL2 or inside of the second threshold range R2.

At 210, the SCR efficiency monitoring module 106 disables and/or does not perform conversion efficiency monitoring when the first comparison signal is TRUE. At 212, the SCR efficiency monitoring module 106 enables and/or performs conversion efficiency monitoring when the first comparison signal is FALSE.

The SCR efficiency monitoring module 106 includes an efficiency determining module 130, an efficiency comparison module 132, a distribution generation module 134, and an efficiency validation module 136. The modules 130, 132, 134, 136 may be enabled, for example, when conversion efficiency monitoring is enabled.

At 214, the NO sensors 62, 64 generate the NO signals NOX1, NOX2. At 216, the efficiency determining module 130 determines actual conversion efficiency of the SCR catalyst 18 based on the SCR enable/disable signal SCRACT 122. The efficiency determining module 130 may determine conversion efficiency based on mass flow rates (e.g., milligrams/second) entering and exiting the SCR catalyst 18. The mass flow rates may be determined based on, for example, the $NO_x$ signals NOX1, NOX2 (140, 142) from the NO sensors 62, 64. The conversion efficiency may be determined using, for example, equation 5.

$$SCREFF = 1 - \left[\frac{\int_0^t \dot{m}_{DWN} dt}{\int_0^t \dot{m}_{UP} dt}\right] \quad (5)$$

The efficiency determining module 130 may periodically determine conversion efficiency SCREFF (signal 144) unless the SCR enable/disable signal SCRACT 122 indicates disabling conversion efficiency monitoring. Disabling conversion efficiency monitoring refers to not determining conversion efficiency and/or ceasing determination of conversion efficiency. The engine control system 10 and/or the diagnostic control system 16 may be operated based on previously determined conversion efficiency values when conversion efficiency monitoring is disabled.

The following tasks 218-222 may be performed or task 224 may be performed when task 216 is completed. Tasks 218-222 may be performed based on vehicle mileage. Tasks 218-222 may be performed when the vehicle mileage is greater than a predetermined vehicle mileage (e.g., 120,000 miles) or when the mileage of the vehicle is within a predetermined mileage range (e.g., 120,000-121,000 miles).

At 218, the efficiency comparison module 132 may determine average (recorded) efficiency values. The average efficiency values may be provided by an average efficiency signal AES 148 received from memory 150. The average efficiency values may include least acceptable efficiency values WPAs 154. Each of the average efficiency values may correspond to an exhaust flow rate and an average SCR temperature. The WPAs 154 may include calibrated values predetermined and stored in the memory 150 and/or values generated during conversion efficiency monitoring. The average efficiency values may be generated based on tables, equations, and/or efficiency models of the SCR catalyst 18. The efficiency models may be based on predetermined models of the SCR catalyst 18 for a predetermined number of vehicle miles. For example, a predetermined efficiency model of the SCR catalyst 18 may be stored in the memory 150 for 120,000 miles. The memory 150 also stores the actual (measured) conversion efficiency values 156 determined by the efficiency determining module 130.

At 220, the efficiency comparison module 132 may compare the actual conversion efficiency SCREFF to the average efficiency values to generate a comparison signal (second comparison signal) COMP 146. The comparison signal may be generated based on a difference between, for example, the actual conversion efficiency values and each of the least acceptable efficiency values WPAs 154. Example differences are provided by equation 6.

$$COMP_1 = SCREFF - WPA \quad (6)$$

At 222, the distribution generation module 134 may generate a WPA distribution based on the comparison signal COMP ($COMP_1$ values) and/or based on calibrated and stored WPA distributions. The WPA distribution is provided by distribution signal DIST 160 (third comparison). The distribution generation module 134 may determine mean and standard deviation values associated with equation 6. The WPA distribution may be referred to as an average recorded efficiency model when tasks 218-222 are performed and include, for example, 4σ (4 sigma) point values for exhaust flow rate and average SCR temperature pairs.

At 224, the efficiency validation module 136 compares the actual conversion efficiency SCREFF to a threshold efficiency value, the average efficiency values determined at 220, and/or the WPA distribution determined at 222. The average efficiency values and/or the WPA distribution may be compared with the actual conversion efficiency SCREFF when there are a predetermined number of samples for a current exhaust flow rate and a current average SCR temperature. If the number of samples used to generate each of the average efficiency values is less than the predetermined number of samples than the efficiency validation module 136 compares the actual conversion efficiency SCREFF to the threshold efficiency value and not to the average efficiency values and the WPA distribution.

At 224, the average efficiency values may not be compared with the actual conversion efficiency SCREFF when there is a jump (change) in conversion efficiency over time that is greater than a predetermined change in conversion efficiency. For example, the average efficiency values may not be compared when the conversion efficiency decreases by more than the predetermined change in conversion efficiency. Also, at 224, the threshold efficiency value may be compared with the actual conversion efficiency SCREFF when tasks 218-222 are not performed.

The efficiency validation module 136 may determine the threshold efficiency value based on a function of modeled efficiency (desired or expected efficiency) and a calibratable offset value. The modeled efficiency refers to the expected efficiency of a SCR catalyst throughout the life of the SCR catalyst. The modeled efficiency may include efficiency values for the SCR catalyst corresponding to usage or age (e.g., efficiency values over 0-120,000 miles of operation on a vehicle). The ECM 20 may amounts of diesel exhaust fluid or urea solution based on the modeled efficiency for a current mileage.

The calibratable offset value may be predetermined, stored and determined based on a WPA/BPU distribution, the current exhaust flow rate and the current average SCR temperature. The efficiency validation module 136 may select a calibratable offset value based on stored maps 161. Maps 161 relating calibratable offset values to WPA/BPU distribution values, exhaust flow rates and average SCR temperatures may be stored in the memory 150 and used to select the calibratable offset value. The modeled efficiency, the calibratable offset value, and the WPA/BPU distribution may be predetermined during calibration and stored in the memory 150, as shown by modeled efficiency values 157, calibratable offset values 158, and WPA/BPU distributions 159.

The WPA/BPU distribution includes a WPA distribution and a BPU distribution. During calibration, mean and standard deviation values associated with equations 6 and 7 may be determined. The WPA/BPU distribution may be generated based on the $COMP_1$ and $COMP_2$ values.

$$COMP_2 = SCREFF - BPU \quad (7)$$

Conversion efficiency separation may be determined based on the mean values and/or the standard deviation values. In one implementation, the conversion efficiency separation is determined based on a difference between a 2σ (2 sigma) point of the BPU distribution (values associated with equation 7) and a 4σ point of the WPA distribution (values associated with equation 6). The 2σ point may be greater than a mean of the BPU distribution. The 4σ point may be less than a mean of the WPA distribution. The larger the conversion efficiency separation the less likely that a false indication of a SCR catalyst failing a conversion efficiency test occurs.

Although 2σ and 4σ points are described, the conversion efficiency separation may be based on other standard deviation points. The standard deviation points may refer to empirical data that is used to determine the calibratable offset value. Also, the conversion efficiency separation may alternatively be determined based on: a difference between the mean values of the WPA distribution and the BPU distribution; a distance between the WPA distribution and the BPU distribution; etc.

The calibratable offset value may be selected as a value between a WPA and a BPU distribution, between the 2σ and 4σ points, or between other standard deviation points when setting the efficiency threshold. As an example, the threshold efficiency may be selected within a predetermined range of the 2σ point. The SCR catalyst 18 may pass a conversion efficiency test when the actual conversion efficiency SCREFF is greater than the threshold efficiency and/or one of the average efficiency values. The SCR catalyst 18 may fail a conversion efficiency test when the actual conversion efficiency SCREFF is less than or equal to the threshold efficiency and/or one of the average efficiency values.

As another example, the SCR catalyst 18 may pass a conversion efficiency test when the actual conversion efficiency SCREFF is greater than the 4σ point of the WPA distribution. The SCR catalyst 18 may fail a conversion efficiency test, for example, when the actual conversion efficiency SCREFF is less than the 2σ point of the BPU distribution. The efficiency validation module 136 generates a validation signal VALID 162 based on the third comparison. As an example, the validation signal may be HIGH when the SCR catalyst 18 passes and LOW when the SCR catalyst fails the conversion efficiency test.

At 226, the efficiency validation module 136 determines whether the SCR catalyst 18 and/or the actual conversion efficiency passed. Task 228 may be performed when the SCR catalyst 18 and/or the actual conversion efficiency failed. Task 200 or 202 may be performed when the SCR catalyst 18 and/or the actual conversion efficiency passed.

At 228, the countermeasure module 108 performs a countermeasure based on the validation signal. Countermeasures may be performed when the validation signal indicates the SCR catalyst 18 failed the conversion efficiency test. The countermeasures may include, for example, limiting vehicle speed and/or engine speed and/or perform other remedial actions. The method may end at 230 after task 228 or return to task 200 or 202.

The above-described tasks are meant to be illustrative examples; the tasks may be performed sequentially, synchronously, simultaneously, continuously, during overlapping time periods or in a different order depending upon the application. The above-described implementation is simpler and less resource intensive to calibrate than mode detailed modeling of numerous temperatures at discrete locations within a SCR catalyst. The above-described implementation provides constant or periodic evaluation of temperature differences between upstream and downstream sensors of a SCR catalyst. This allows for "real time" evaluation. Real time refers to the ability to constantly detect the temperature gradients and evaluate the temperature gradients when detected. The real time evaluations may be performed without inference to past and/or future temperature measurements.

The ECM 20 may further include an exhaust temperature control module 170, a fuel control module 172 and a HC injector control module 174. The exhaust temperature control module 170 may intrusively control temperature of the SCR catalyst 18. The term intrusive may refer to varying operation of the engine outside of predetermined "normal" operating conditions from an emissions perspective to allow the conversion efficiency test to be performed.

The diagnostic control module 17 may initiate a conversion efficiency test (which may be intrusive) when the SCR catalyst 18 fails a prior conversion efficiency test. The diagnostic control module 17 may signal to the exhaust temperature control module 170 to initiate intrusive temperature control of the SCR catalyst 18 prior to a conversion efficiency test. The diagnostic control module 17 ensures that enable conditions are met prior to testing.

The ECM 20, the SCR efficiency monitoring module 106 and/or the exhaust temperature control module 170 may adjusts operating parameters prior to a conversion efficiency test. For example, operating parameters such as dosing, $NH_3$ load, and exhaust gas recirculation (EGR) may be adjusted within corresponding windows prior to the conversion efficiency test.

The fueling control module 172 determines fuel quantity, fuel injection timing, post injection, etc. When in the intrusive SCR test mode, the exhaust temperature control module 170 adjusts fueling. The fueling adjustment increases a temperature of the SCR catalyst 18. Alternately, the hydrocarbon (HC) injection module 174 injects fuel into the exhaust system 14 upstream from the DOC 32 to generate an exotherm to increase the temperature in the SCR catalyst 18.

The above-described disclosure eliminates monitoring and storing of conversion efficiencies when temperature gradients are greater than a threshold. This includes temperature gradients that exist for extended periods of time. The above-described disclosure also permits and/or reenables monitoring and storing of conversion efficiencies when temperature gradients are less than or equal to the threshold. The monitoring and storing of conversion efficiencies is disabled without penalizing in-use rates unnecessarily for short term temperature gradient events.

An in-use rate refers to the number of times that conversion efficiency monitoring is performed and/or passed relative to a number of times that a vehicle has satisfied a set of drive cycle operating conditions. Drive cycle operating conditions may include, for example: operating at a certain altitude; operating when ambient temperature is greater than a predetermined ambient temperature; amount of time that an engine is idling has exceeded a predetermined threshold; coolant temperature is greater than a predetermined temperature; etc. The drive cycle operating conditions may be adjusted to be less restrictive when conversion efficiency separation is not improved and/or to improve conversion efficiency separation. The drive cycle operating conditions may be monitored and/or adjusted, for example by the diagnostic control module and/or the SCR efficiency monitoring module of FIG. 2. A short term temperature gradient event refers to an event with a temperature gradient that is greater than the threshold and exists for less than a predetermined period.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic control module comprising:
a temperature gradient module that determines a temperature gradient across a selective catalytic reduction (SCR) catalyst of an exhaust system of an engine based on a plurality of temperature signals;
a calibration module that determines a weighted average based on the plurality of temperature signals; and
a SCR efficiency control module that disables conversion efficiency monitoring based on the temperature gradient and the weighted average.

2. The diagnostic control module of claim 1, wherein:
the temperature gradient module receives a first temperature signal and a second temperature signal;
the first temperature signal indicates that a first temperature upstream of the SCR catalyst; and
the second temperature signal indicates that a second temperature downstream of the SCR catalyst.

3. The diagnostic control module of claim 1, wherein:
the calibration module receives a first temperature signal and a second temperature signal;
the first temperature signal indicates a first temperature upstream of the SCR catalyst;
the second temperature signal indicates a second temperature downstream of the SCR catalyst; and
the calibration module determines the weighted average based on a first weight and a second weight.

4. The diagnostic control module of claim 3, wherein the calibration module determines the weighted average based on a sum of the first temperature multiplied by the first weight and the second temperature multiplied by one minus the second weight.

5. The diagnostic control module of claim 1, wherein the SCR efficiency control module:
compares the temperature gradient to at least one of first calibration value and a first range;
compares the weighted average to at least one of a second calibration value and a second range; and
generates a disable signal when at least one of (i) the temperature gradient is greater than the first calibration value; (ii) the temperature gradient is outside of the first range; (iii) the weighted average is greater than the second calibration value; and (iv) the weighted average is outside of the second range.

6. The diagnostic control module of claim 1, wherein the SCR efficiency control module:
compares the temperature gradient to a first calibration value;
compares the weighted average to a second calibration value; and
generates a disable signal when (i) the temperature gradient is greater than the first calibration value and (ii) the weighted average is greater than the second calibration value.

7. The diagnostic control module of claim 1, further comprising a SCR efficiency monitoring module, wherein:
the SCR efficiency control module generates a disable signal based on the temperature gradient and the weighted average; and
the SCR efficiency monitoring module determines conversion efficiency based on the disable signal.

8. The diagnostic control module of claim 7, further comprising a countermeasure module, wherein:
the SCR efficiency monitoring module generates an efficiency distribution based on the conversion efficiency and a modeled least acceptable value; and
the SCR efficiency monitoring module compares the conversion efficiency to a threshold efficiency, an average efficiency, and the efficiency distribution and generates a validation signal; and
the countermeasure module performs a countermeasure based on the validation signal.

9. A diagnostic control module comprising:
a temperature gradient module that determines a temperature difference between a first temperature signal and a second temperature signal;
a calibration module that determines a threshold value; and
a selective catalytic reduction (SCR) efficiency control module that generates a disable signal to stop determining conversion efficiency based on the temperature difference and the threshold value,
wherein the first temperature signal indicates a first temperature of an exhaust system upstream from a SCR catalyst, and
wherein the second temperature signal indicates a second temperature of the exhaust system downstream of the SCR catalyst.

10. The diagnostic control module of claim 9, wherein the calibration module:
receives the first temperature signal and the second temperature signal; and
determines the threshold value based on a first weight and a second weight.

11. The diagnostic control module of claim 10, wherein the calibration module determines the threshold value based on a sum of the first temperature multiplied by the first weight and the second temperature multiplied by one minus the second weight.

12. The diagnostic control module of claim 9, wherein the SCR efficiency control module:
compares the temperature gradient and the threshold value; and
generates the disable signal when the temperature gradient is greater than the threshold value.

13. The diagnostic control module of claim 9, wherein the SCR efficiency control module:
compares the temperature gradient and the threshold value; and
generates the disable signal when the temperature gradient is less than the threshold value.

14. The diagnostic control module of claim 9, further comprising a SCR efficiency monitoring module,
wherein the SCR efficiency monitoring module determines efficiency of the SCR catalyst based on the disable signal.

15. The diagnostic control module of claim 14, further comprising a countermeasure module, wherein:
the SCR efficiency monitoring module generates an efficiency distribution based on the efficiency of the SCR catalyst and a modeled least acceptable value; and
the SCR efficiency monitoring module compares the efficiency of the SCR catalyst to a threshold efficiency, an average efficiency and the efficiency distribution and generates a validation signal; and
the countermeasure module performs a countermeasure based on the validation signal.

16. A method of operating a diagnostic control module comprising:
generating a first temperature signal that indicates a first temperature upstream of a selective catalytic reduction (SCR) catalyst;
generating a second temperature signal that indicates a second temperature downstream of the SCR catalyst;

determining a temperature gradient based on the first temperature and the second temperature;
determining a weighted average based on a first weight multiplied by the first temperature and a second weight multiplied the second temperature;
generating a disable signal based on a first comparison between the temperature gradient and a first calibration value and a second comparison between the weighted average and a second calibration value; and
disabling conversion efficiency monitoring based on the disable signal.

17. The method of claim 16, further comprising:
determining the weighted average based on a sum of the first temperature multiplied by the first weight and the second temperature multiplied by one minus the second weight; and
generating the disable signal when magnitude of the temperature gradient is greater than the first calibration value.

18. The method of claim 16, further comprising:
determining efficiency of the SCR catalyst based on the disable signal;
generating an efficiency distribution based on the efficiency of the SCR catalyst and a modeled least acceptable value;
determining a threshold efficiency based on a modeled efficiency, an offset value, an exhaust flow rate, and an average SCR temperature;
comparing the efficiency of the SCR catalyst to the threshold efficiency and generating a validation signal; and
performing a countermeasure based on the validation signal.

19. The method of claim 18, further comprising maximizing separation between a maximum unacceptable efficiency distribution and a least acceptable efficiency distribution of the SCR catalyst based on disabling of the conversion efficiency monitoring.

* * * * *